US007580826B2

(12) United States Patent
Vega et al.

(10) Patent No.: US 7,580,826 B2
(45) Date of Patent: Aug. 25, 2009

(54) SYSTEMS AND METHODS FOR DEVELOPMENT OF EMULATED DEVICES IN A VIRTUAL MACHINE ENVIRONMENT

(75) Inventors: Rene Antonio Vega, Kirkland, WA (US); Eric P. Traut, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 10/883,620

(22) Filed: Jun. 30, 2004

(65) Prior Publication Data

US 2006/0004554 A1    Jan. 5, 2006

(51) Int. Cl.
*G06G 7/48* (2006.01)
*G06F 7/62* (2006.01)
*G06F 9/44* (2006.01)
*G06F 9/455* (2006.01)

(52) U.S. Cl. .............................. 703/24; 703/3; 703/13; 703/21; 718/1

(58) Field of Classification Search .................. 703/13, 703/6, 3, 21, 1, 24, 8; 718/1
See application file for complete search history.

(56) References Cited

U.S. PATENT DOCUMENTS

| 5,953,516 A * | 9/1999 | Bonola .......................... 703/24 |
| RE36,394 E | 11/1999 | Advani et al. ................ 713/100 |
| 6,243,833 B1 * | 6/2001 | Hitchcock et al. ............. 714/33 |
| 6,253,224 B1 | 6/2001 | Brice, Jr. et al. ................ 718/1 |
| 6,496,847 B1 | 12/2002 | Bugnion et al. ................. 718/1 |
| 6,725,449 B1 * | 4/2004 | Maeda et al. ................ 717/124 |
| 6,968,307 B1 * | 11/2005 | Chrysanthakopoulos ..... 703/27 |
| 2002/0069369 A1 * | 6/2002 | Tremain ..................... 713/201 |
| 2002/0087917 A1 | 7/2002 | Boehm et al. .................. 714/38 |

FOREIGN PATENT DOCUMENTS

GB        2 365 577 A        2/2002

OTHER PUBLICATIONS

Dike, Jeff., "User-mode Linux," USENIX Association, Proceedings of the 5th Annual Linux Showcase & Conference, 2001, 12 pages.

* cited by examiner

*Primary Examiner*—Paul L Rodriguez
*Assistant Examiner*—Nithya Janakiraman
(74) *Attorney, Agent, or Firm*—Woodcock Washburn LLP

(57) ABSTRACT

The present invention discloses dynamically adding virtual devices to a virtual computing environment. The system described in the invention includes a virtualized computing system with a manifest, which further includes device lists and an external device directory, which provides users of the virtualized computing system with a directory for adding software plug-ins that contain specifications needed to add virtual devices to the virtual computing environment. Certain embodiments are specifically directed to providing a method of adding and configuring virtual devices. Certain embodiments are specifically directed to providing a method of operating a virtualized computing system wherein the host operating system and the virtual devices progress through a series of states, such as: initializing, powering up, loading a stored state, operating in normal state, saving state for future restoration, powering down, and tearing down and turning off.

21 Claims, 9 Drawing Sheets

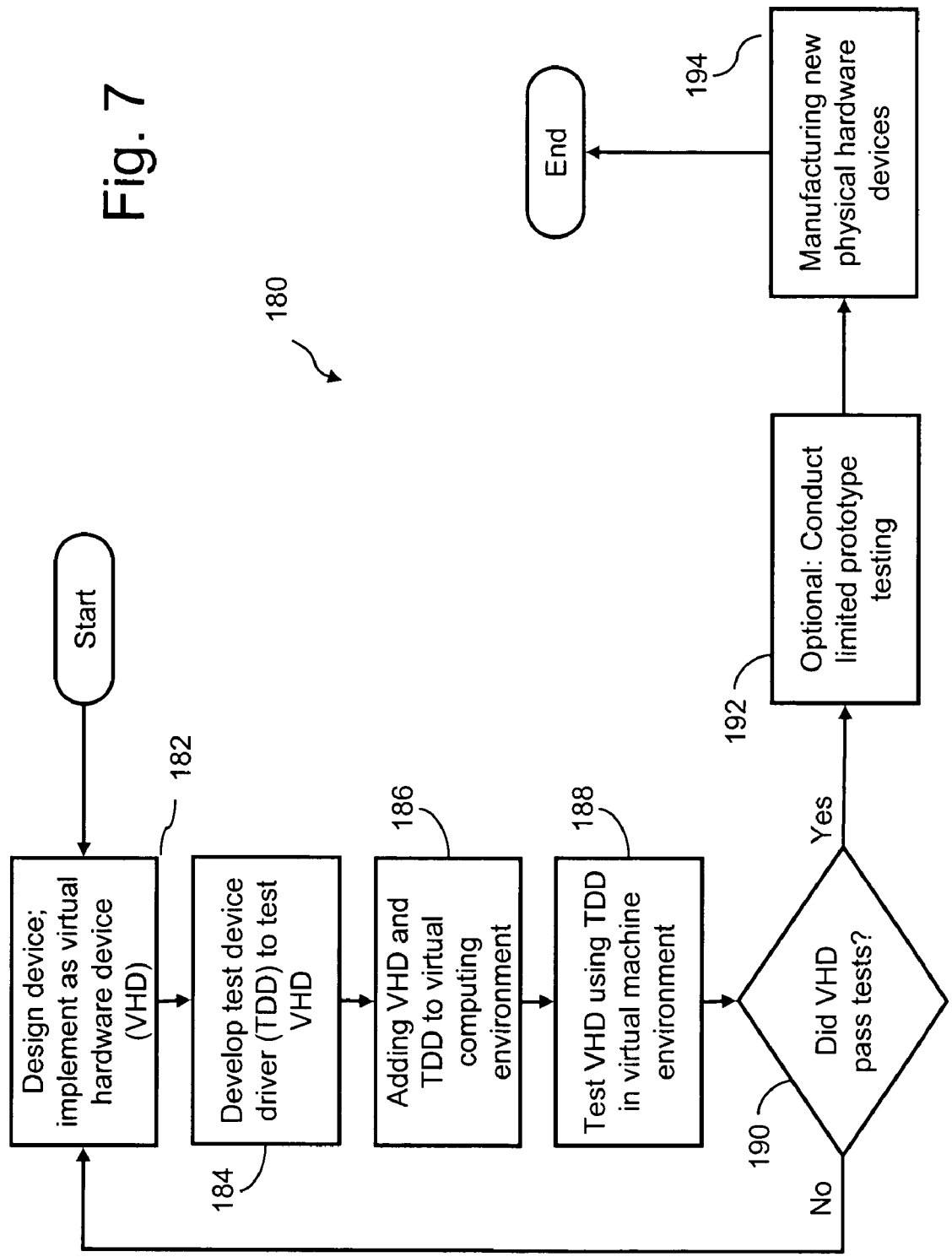

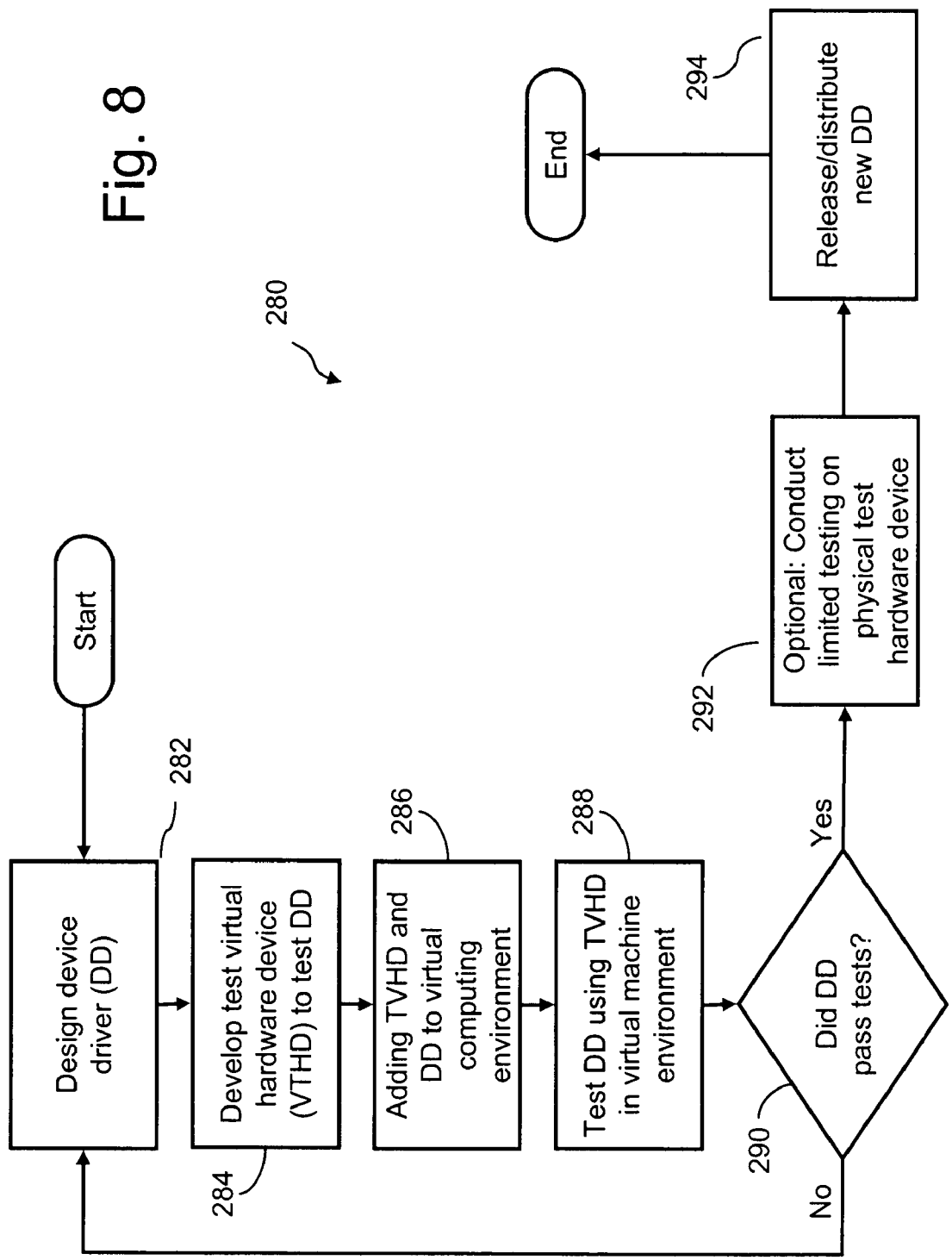

SYSTEMS AND METHODS FOR DEVELOPMENT OF EMULATED DEVICES IN A VIRTUAL MACHINE ENVIRONMENT

CROSS-REFERENCE

This application is related by subject matter to the invention disclosed in the following commonly assigned application: U.S. patent application Ser. No. (10/734,450), filed on Dec. 12, 2003 and entitled "SYSTEMS AND METHODS FOR BIMODAL DEVICE VIRTUALIZATION OF ACTUAL AND IDEALIZED HARDWARE-BASED DEVICES," the entirety of which is hereby incorporated by reference herein.

FIELD OF THE INVENTION

The present invention generally relates to the field virtual machines (also known as "processor virtualization") and software that executes in a virtual machine environment. More specifically, the present invention is directed to systems and methods for developing and deploying virtual devices that emulate the behavior of physical devices.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

A virtual device is a logical device, implemented in software, which corresponds to some kind of actual or idealized physical device. Generally, there are two approaches for modeling virtual devices: the "hardware virtual device" approach, which directly models an existing piece of hardware, and the "idealized virtual device" approach, which is not a mere reflection of the physical hardware, but is optimized for the virtual machine (VM) environment.

The hardware virtual device approach offers advantages in regard to compatibility; as the virtual device acts just like a real device in every respect, software that has been designed to interact with that device (e.g., a driver) will work with a hardware virtual device without modification. However, hardware virtual devices are at a disadvantage when it comes to performance, as physical hardware is often difficult to emulate with a virtual device without its incurring significant overhead costs (and inefficiencies) because hardware designers generally do not take into consideration virtualization issues and, thus, hardware virtual devices are often noticeably slower than their real hardware counterparts.

Idealized virtual devices, on the other hand, provide significant freedom for developers to design a virtual device that is both easy to implement and efficient to use. Because the design of an idealized virtual device does not need to conform to the limitations imposed by the physical hardware design, idealized virtual devices can be optimized for use within a VM environment. Furthermore, developers of idealized virtual devices do not need to concern themselves with the subtle side effects (such as, for example, timing and state changes) that existing software might rely on for correct operation. Moreover, developers can also create idealized virtual devices that are analogous to hardware that does not, in fact, exist—for example, a virtual device that allows for communication between a guest system and a host system. However, there is a risk that compatibility issues may arise when the idealized virtual device approach is used, as the virtual device may not, in fact, operate exactly like the real device in every respect, and software that has been designed to interact with that physical device (e.g., a driver) may not work correctly or at all with an idealized virtual device without modification.

Presently, the set of virtual devices (idealized or hardware) available in a virtual machine are predetermined at the time when the virtual machine software is written, and current virtual machine products do not include a means for adding new virtual devices. This means that the number and variety of devices is limited to those that are included in the virtual machine software. As technology advances and the number of devices (physical and virtual) continues to escalate, the ability to be able to add new virtual devices to virtual machine software has become more critical. What is needed is a way to dynamically add new virtual devices, as needed, in a virtual machine environment.

In addition to the needs of the virtual machine environment, there is also a general need for a means by which new virtual devices may be added to a system to support both the development of hardware as well as the develop of software drivers for that hardware. In regard to new hardware, there is a need for quality testing to find and eliminate bugs other unanticipated errors in a new hardware device. Generally the approach to this type of testing is wait until after the hardware devices have been designed and a prototype has been manufactured. However, this design-prototype-test process is inefficient in that, if errors are found during testing, the process starts again from the beginning and thus results in long development cycles for new devices. What is needed is a way to decrease the time to market for physical device products. Similarly, conducting complete testing of new device driver software for physical hardware devices, both old and new, is time consuming at best and, in some cases, difficult or even impossible to complete because inducing a physical hardware device to produce a wide variety of errors for handling by the device driver in a timely and meaningful fashion is difficult. The result is that many of the paths of driver code in the software driver are not fully exercised because the physical hardware devices upon which the tests are run do not (and really cannot) exhibit the full range of errors during a finite testing period. Therefore, what is needed is a way to reduce the time needed for, and to improve the quality of, device driver software testing.

Virtual devices seemingly offer a solution in both regards: a hardware virtual device mirroring the capabilities of a proposed physical hardware device could be used to test certain hardware capabilities and compatibilities before a physical prototype is developed, thereby shortcutting the design process as it is easier to modify virtual device than it is to modify a physical prototype device. Similarly, for testing new device driver software, an idealized virtual device could be used to raise all of the desired hardware device errors necessary to fully test the new device driver (where the virtual device is "idealized" in the sense of creating the desired errors, thereby eliminating the need to physically create a hardware device to purposely do so). However, the shortcoming to this approach is the fact that virtual devices tend to be hardcoded-that is, they tend to be written directly into the monolithic container of the virtual computing environment, and thus they are not easily modifiable. For example, in existing virtual machine environments, the virtual machine loads only those virtual devices that it is hardcoded to load. Therefore, what is needed in the art is a virtual computing environment that allows dynamic and modifiable loading of new virtual devices.

SUMMARY OF THE INVENTION

Several embodiments of the present invention provide a means for dynamically adding virtual devices to a virtual computing environment. The invention includes a virtualized computing system that has a manifest (which includes an internal device lists) as well as an external device directory which provides users of the virtualized computing system with a means for adding software plug-ins that contain specifications needed to add virtual devices to the virtual computing environment. A method of adding virtual devices is described wherein this external device directory is scanned, the appropriate device properties are obtained, specified, and saved by the user, and the new virtual devices are added to the manifest and are available for use in the virtual computing environment.

Certain of these embodiments are specifically directed to providing a method of operating a virtualized computing system wherein the host operating system and the virtual devices progress through a series of states, specifically: initializing, powering up, loading a stored state, operating in normal state, saving state for future restoration, powering down, and tearing down and turning off. The states that precede normal operation are described as preparing the virtual devices to operate. The normal operating state is the state in which all devices are ready, and the host operating system accepts requests from guest operating systems. The states that follow normal operation are described as undoing the steps that preceded normal operation in preparation for the computing device being turned off.

Certain of these embodiments are specifically directed to providing a means for testing virtual devices in the development of physical devices. These embodiments assist in the development of physical devices in two important ways: 1) they allow for testing of the devices to begin before a prototype is physically manufactured, and 2) they allow for errors to be intentionally introduced into the device, which provides for much more complete testing of paths within device driver software than was previously possible.

Certain additional embodiments are specifically directed to providing a means for providing error-prone idealized virtual devices for testing and assisting in the development of device driver software. These embodiments assist in the development of device drivers in two important ways: (1) they allow for testing of the device without purposefully developing an error-prone prototype, and (2) they allow for a wide range of errors to be intentionally produced for fuller and richer testing of the new device driver.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 7 illustrates a method of designing and testing a virtual hardware devices using a virtual computing environment; and FIG. 8 illustrates a method of designing and testing a device driver using virtual hardware in a virtual computing environment.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
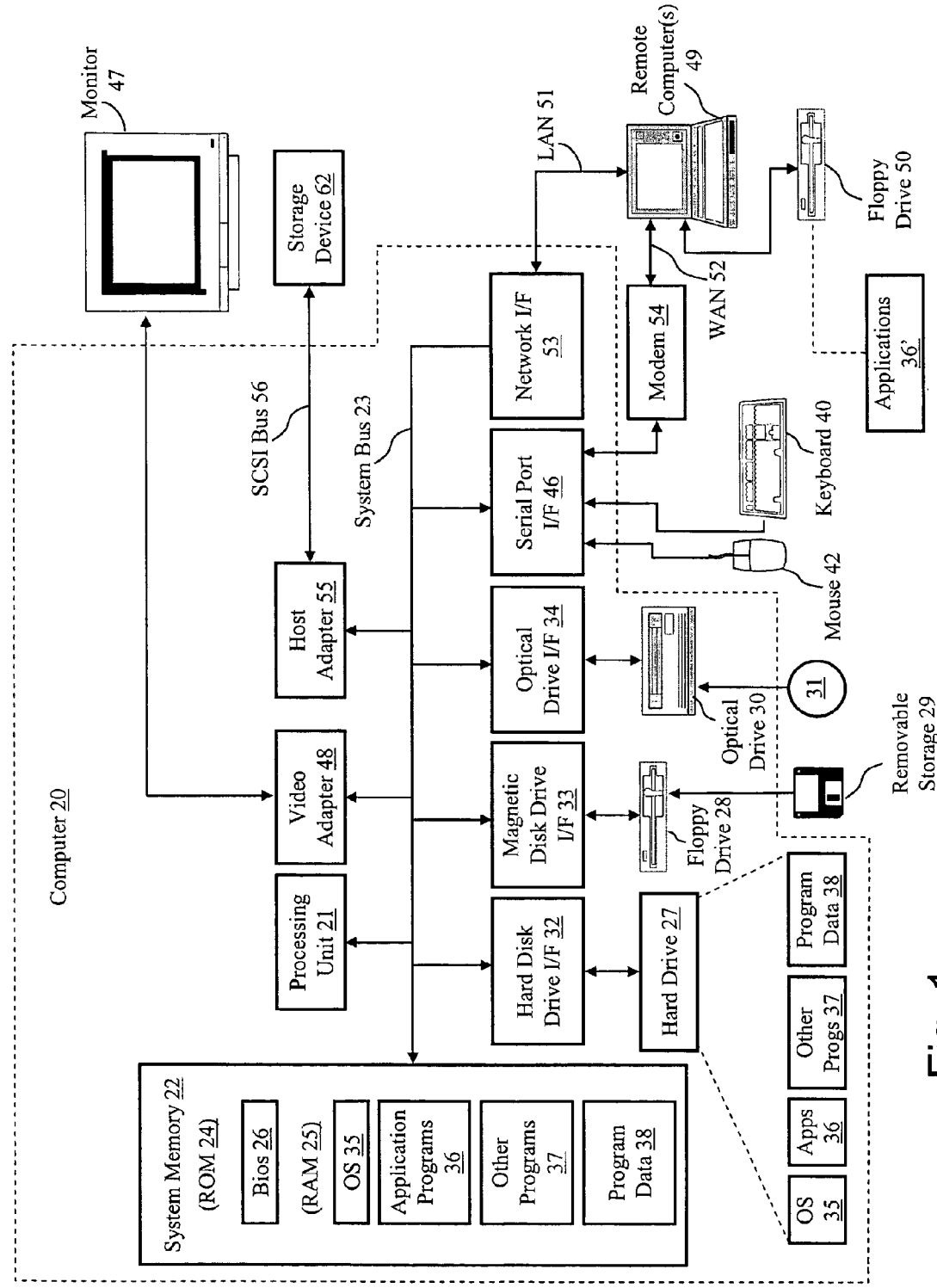
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
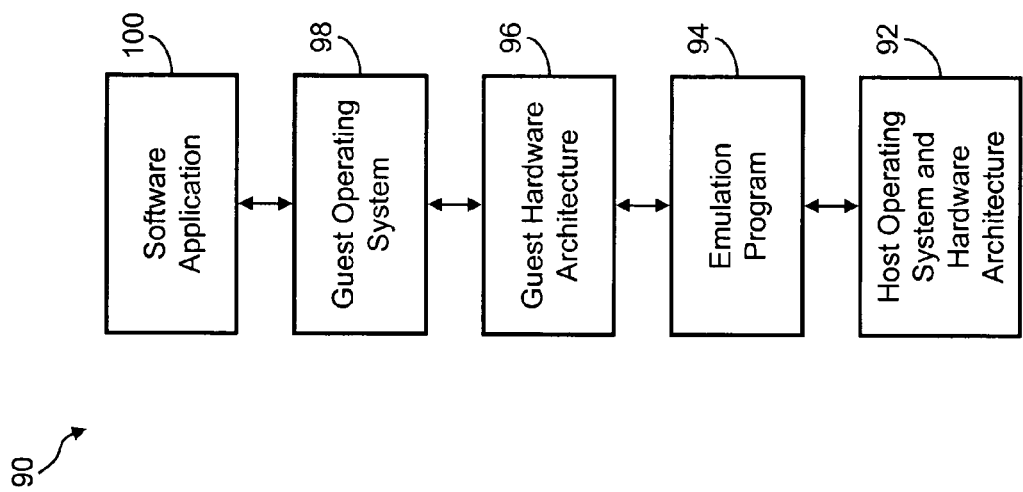
FIG. 2 illustrates the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3A:
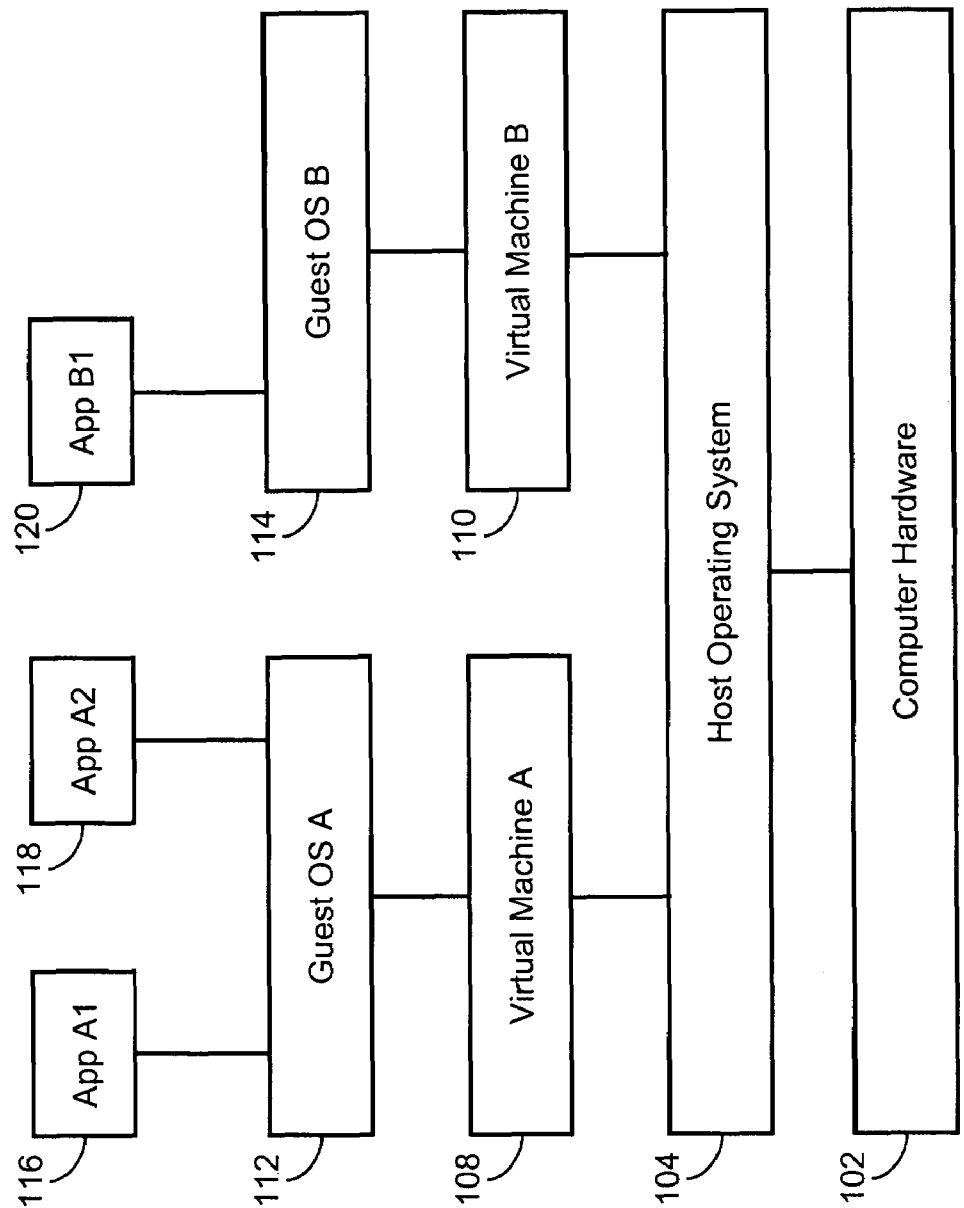
FIG. 3A illustrates a virtualized computing system.

FIG. 3A illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

Figure 3B:
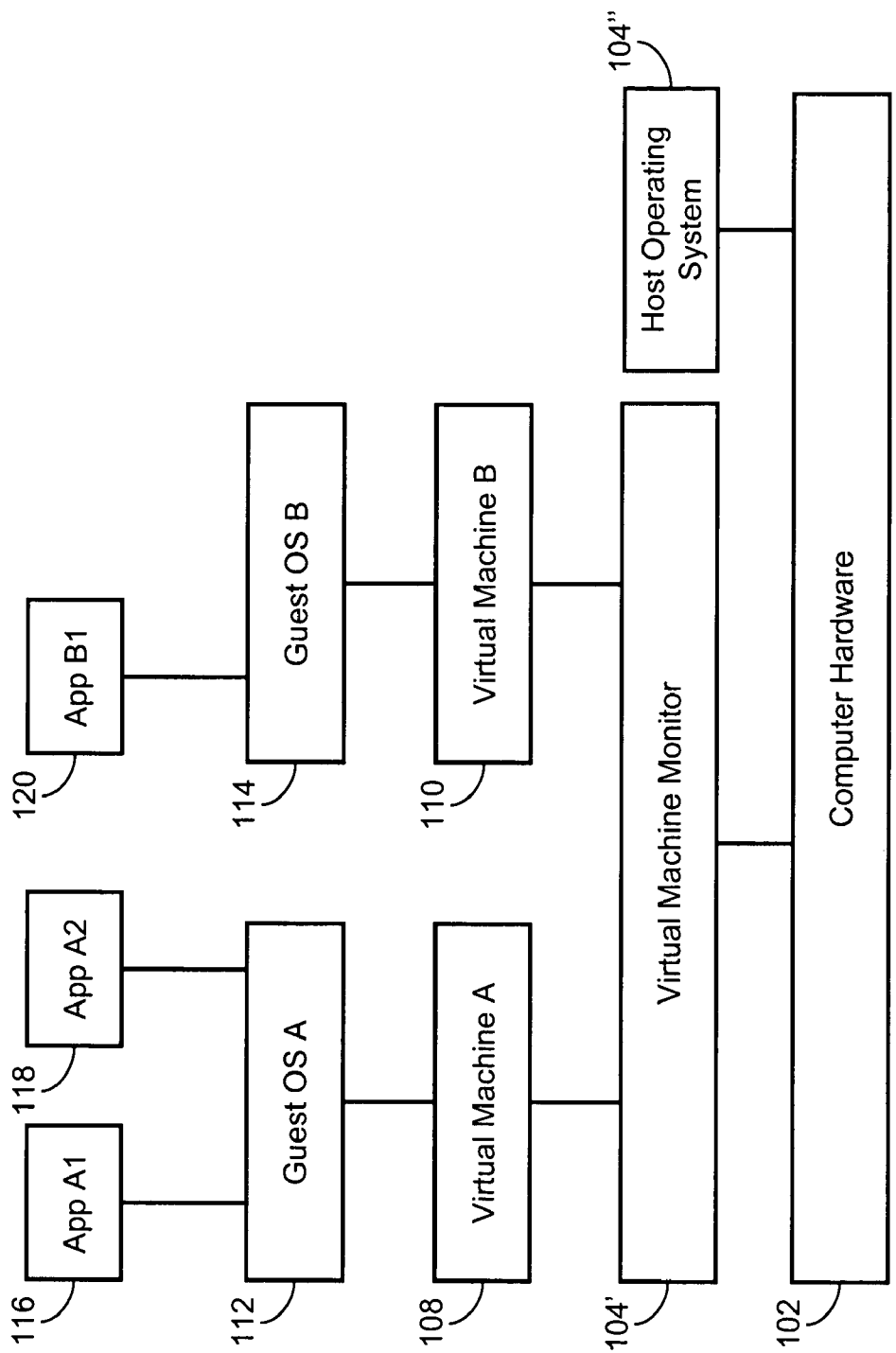
FIG. 3B illustrates an alternative embodiment of a virtualized computing system comprising a virtual machine monitor running alongside a host operating system.

Alternately, a virtual machine monitor, or VMM, software layer 104' may be running in place of or alongside a host operating system 104", the latter option being illustrated in FIG. 3B. For simplicity, all discussion hereinafter (specifically regarding the host operating system 104) shall be directed to the embodiment illustrated in FIG. 3A; however, every aspect of such discussion shall equally apply to the embodiment of FIG. 3B wherein the VMM 104' of FIG. 3B essentially replaces, on a functional level, the role of the host operating system 104 of FIG. 3A described herein below.

Referring again to FIG. 3A, above the host OS 104 (or VMM 104') are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSs) A 112 and B 114 respectively. Above guest OS A 112 are running two applications, application A1 116 and application A2 118, and above guest OS B 114 is application B1 120.

Dynamically Adding Virtual Devices

Figure 4:
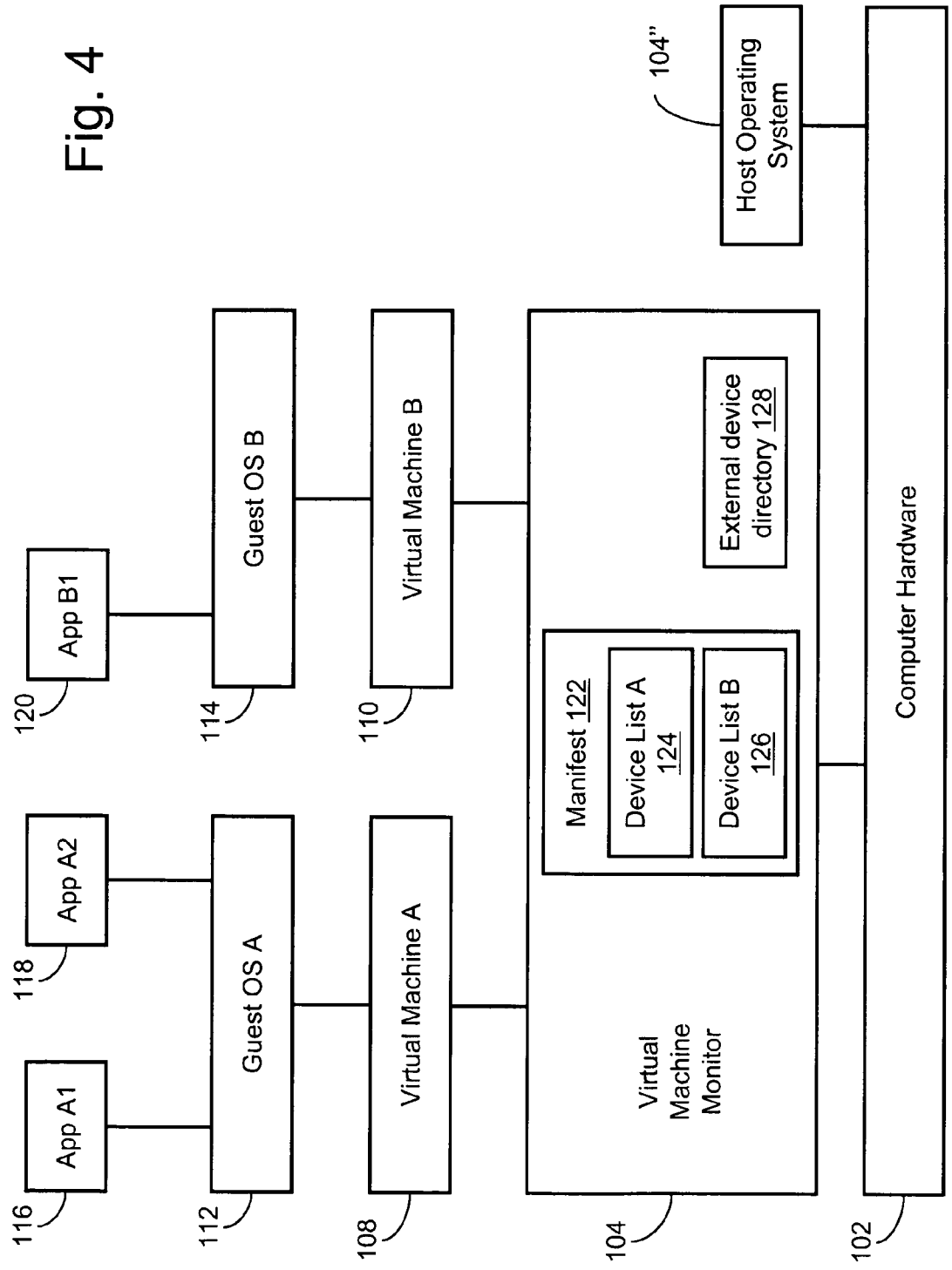
FIG. 4 illustrates the virtualized computing system of FIG. 3B, including file structures related to virtual devices within a virtual machine monitor.

FIG. 4 illustrates a virtualized computing system, such as the virtual machine monitor (VMM) system illustrated in FIG. 3B (or, for alternative embodiments, such as the Host OS system illustrated in FIG. 3A). In the figure, a manifest 122 is a configuration file within host OS 104 that further contains device list A 124 and device list B 126. Manifest 122 is used to configure and enumerate the virtual devices to be used by host OS 104. Device list A 124 and device list B 126 contain the list and associated parameters for all virtual devices available for use by VM A 108 and VM B 110, respectively. According to the present invention, some of the devices listed in the devices lists 124 and 126 of the manifest 122 added to the list over time (externally defined devices) in addition to those that were included when the virtual machine software (e.g., Virtual PC) was installed. Information identifying and describing virtual devices are stored within device list A 124 and device list B 126. Additionally, in some examples, the virtual devices contain a filename which, in one example, is to a dynamic link library (DLL) file, which is used to further define the device when it is selected for use.

External device directory 128 is a directory that is within host OS 104 and in which information regarding new virtual devices is placed before being added to manifest 122 and being made available to VM A 108 or VM B1 110. In one example, a plug-in is written and stored in external device directory 128 until the method of making virtual devices available to virtual computing devices begins.

Figure 5:
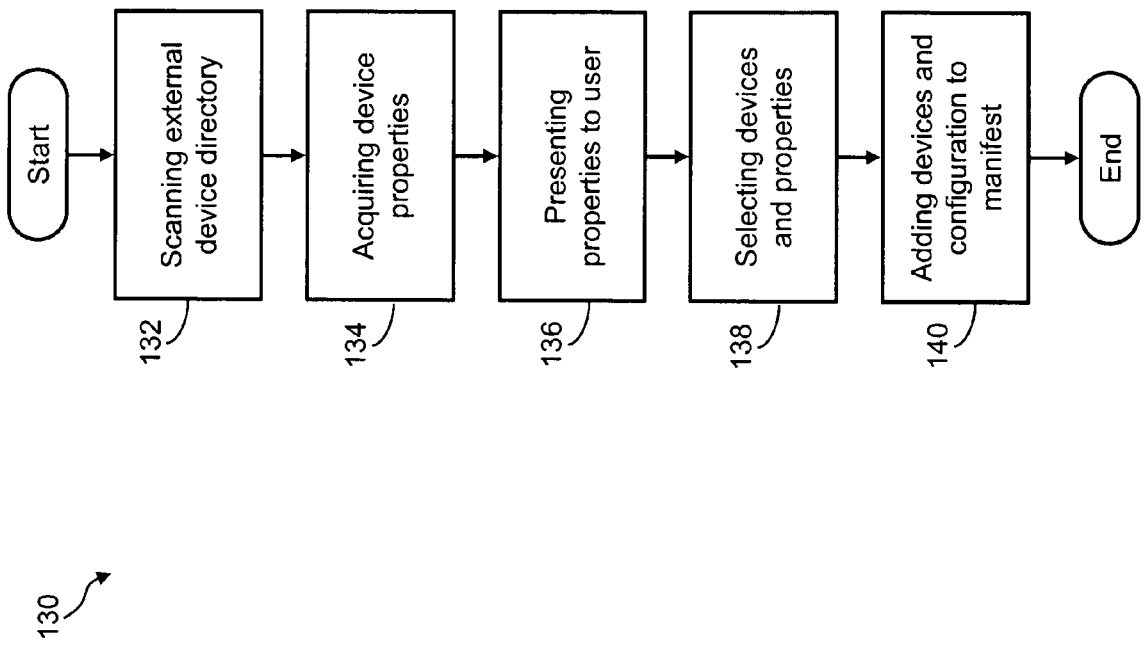
FIG. 5 illustrates a method of adding external devices for use in a virtualized computing system.

FIG. 5 illustrates a method 130 of making virtual devices available to virtual computing devices. Method 130 is described in an example related to VM A 108; however, it is understood by those skilled in the art that this method applies to other virtual machines that are running on host OS 104. At step 132, host OS 104 scans external device directory 128 for external device plug-ins. At step 134, host OS 104 acquires the properties related to each external device. In one example, host OS 104 calls a DLL for each external device, and the DLL returns appropriate properties for each device to host OS 104.

At step 136, the properties for each device are presented to the user. In one example, a graphical user interface (GUI) presents each of the devices and the associated properties to the user. At step 138, the user selects the desired devices and their properties (such as, for example, memory size, bit rate, and display resolution) for each device. At step 140, the user saves the desired devices and their corresponding device properties, and host OS 104 adds the desired devices to manifest 122. At the completion of step 140, method 130 ends and new devices have been configured and added to device list A 124 within manifest 122 and are ready to be utilized by VM A 108 as needed.

Figure 6:
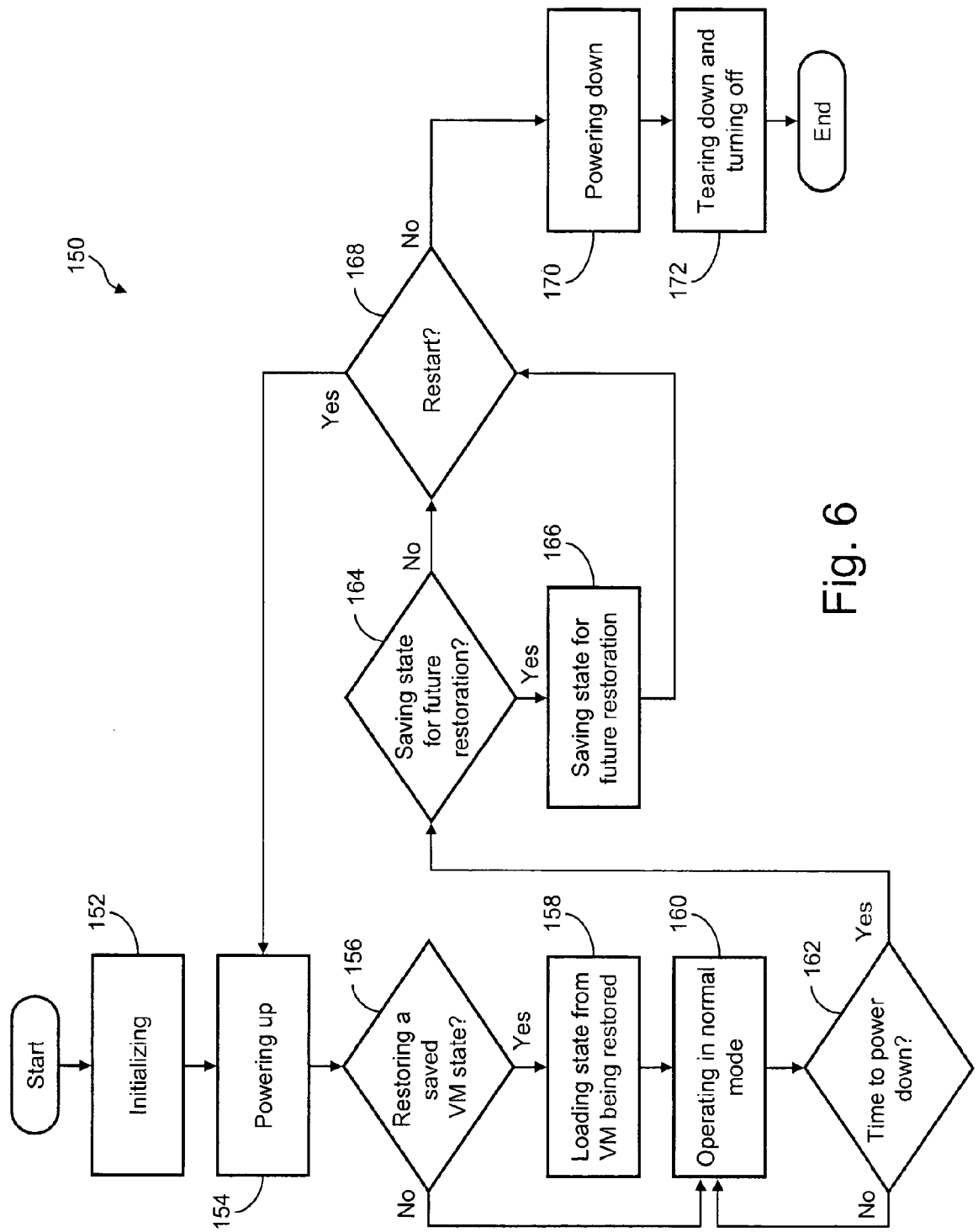
FIG. 6 illustrates a method of operating a virtualized computing system wherein virtual devices are flexibly added.

FIG. 6 illustrates a method 150 of operating a virtualized computing system (as described in reference to FIG. 4) wherein virtual devices are dynamically added. Method 150 describes a progression of "states" that host operating systems and all virtual devices navigate when they operate in a virtualized computing system, as described in reference to FIG. 4.

At step 152, computer 20 (FIG. 1) is turned on, and host OS 104 initializes and allocates resources (such as memory). At step 154, host OS 104 is powering up, and virtual devices virtually wire themselves onto the motherboard, such that they are configured to communicate with host OS 104. Included in this "virtual wiring," host OS 104 executes method 130, which configures the new devices and adds them to device lists A 124 and B 126 within manifest 122 and ready to be utilized by VM A 108 and VM B 110, as needed. In one example with a virtual PCI card, the virtual PCI card communicates with the virtual PCI bus, in order to notify the virtual PCI bus that, for example, the virtual PCI card is present and in which slot. I/O port ranges are also defined in step 154. In another example, as the interrupt controller (not shown) powers up in this step, the interrupt controller communicates with the I/O controller (not shown), in preparation for normal operation.

At decision step 156, a determination is made by host OS 104 about whether a previously stored state is being restored. If host OS 104 is restoring a stored state, method 150 proceeds to step 158; if host OS 104 is not restoring, all devices are set to a default state value and method 150 proceeds to step 160.

At step 158, host OS 104 accesses and loads the stored snapshot file that contains the state data for the virtual processor and the virtual devices, as well as the device list generated when the snapshot file was saved. Loading a snapshot file allows the virtual machine processor and devices to "reanimate" themselves to the exact point in time when the state of the virtual machine was last saved. In one example, a snapshot file (not shown) is loaded in order to reanimate VM A 108 and its devices and their corresponding configuration stored in device list A 124 within manifest 122.

At step 160, initialization is complete, and host OS 104 enters normal operating mode (i.e., powered-up state). In normal operating mode, host OS 104 processes requests from VM A 108 and VM B 110. In one example, VM A 108 utilizes virtual devices, as stored in device list A 124 and host OS 104, translates communications from those virtual devices, and employs hardware devices within computer hardware 102, as needed.

At decision step 162, host OS 104 determines whether a power-down request has been received. If a power-down request has been received, method 150 proceeds to step 164; if not, method 150 continues in normal operation mode, by returning to step 160.

At decision step 164, in preparation for powering down, host OS 104 determines whether a request has been made to save the state of the virtual machine and virtual devices for future restoration. If a request has been made to save the state of the virtual machine for future restoration, method 150 proceeds to step 166, if not, method 150 proceeds to step 168.

At step 166, host OS 104 saves the state of the virtual processor and all virtual devices for future restoration. At decision step 168, host OS 104 determines whether the power-down request is a "re-start request." If the request is to re-start, method 150 returns to step 154. If not, method 150 proceeds to step 170.

At step 170, host OS 104 releases resources and unwires the virtual devices. Step 170 is the inverse of step 154 and, thus, reverses the tasks performed in step 154. Step 170 proceeds to step 172.

At step 172, host OS 104 de-initializes and prepares for computer 20 to turn off. Step 172 is the inverse of step 152 and, thus, reverses the tasks performed in step 152. Upon completion of step 172, computer 20 is turned off and method 150 ends.

FIG. 7 illustrates a method 180 of designing and testing physical hardware devices in a virtual computing environment. Method 180 streamlines and improves timeliness in designing physical hardware devices by allowing for virtual device testing before any devices (including a prototype) have been physically manufactured by fully testing the devices in a virtualized environment that allows for more complete device testing.

At step 182, a physical hardware device is designed using software tools and is then implemented as a virtual hardware device (VHD) (which is added to external device directory 128 of FIG. 4). At step 184, a special software test device driver (TDD) to test the device is developed. At step 186, the VHD is added by the VMM to the manifest 122 and made available to VM A 108 and VM B1 110, as described in method 130 of FIG. 5, and the TDD is added to guest OS A 112. At step 188, the VHD is tested in the virtual machine environment by the TDD. In this way, the device design is tested by conventional hardware testing routines implemented via the TDD in the virtual environment.

At decision step 190, a determination is made regarding whether the performance of the VHD passed the tests in step 188 and, if no, method 180 returns to step 182, where modifications to the device design are made and the process is repeated. However, if yes at step 190, then method 180 proceeds to optional step 192 where a prototype may be developed and tested (presumably an abbreviated process due to the successful VHD testing) and, at step 194, the new hardware device specifications are finalized and sent to a manufacturing facility and method 180 ends.

FIG. 8 illustrates a method 180 of designing and testing a device driver for physical hardware devices by using a virtual hardware device in a virtual computing environment. Method 280 streamlines and improves timeliness in designing device drivers by allowing for virtual device driver testing without the effort required to design special physical hardware devices that can replicate all of the errors that the device driver will be expected to handle, and thereby enable more complete device driver testing.

At step 282, a device driver (DD) is developed using software tools and is then implemented as a virtual device on a virtual machine (e.g., VM A 108). At step 284, a special virtual test hardware device (VTHD) is developed to test the device driver. At step 286, the VTHD is added by the VMM to the manifest 122 and made available to VM A 108 and VM B 110, as described in method 130 of FIG. 5, and the DD is added to guest OS A 112. At step 288, the DD is tested in the virtual machine environment based on errors generated by the VTHD. In this way, the design of the DD is tested by conventional device driver testing routines implemented via the VTHD in the virtual environment. This testing may include the introduction of intentional errors into the device design, in order to test the paths of the driver software. Additionally, the driver software may be tested expeditiously across a variety of operating systems in a virtual computing environment, by installing the driver on a variety of different guest OSs.

At decision step 290, a determination is made regarding whether the performance of the DD passed the tests in step 288 and, if no, method 280 returns to step 282, where modifications to the DD design are made and the process is repeated. However, if yes at step 290, then method 280 proceeds to optional step 292 where a special physical hardware device may be developed and tested (presumably an abbreviated process on an easily modified hardware device due to the successful VHD testing) and, at step 294, the new device driver is finalized and sent to a distribution and method 280 ends.

Conclusion

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for a virtual computing environment to dynamically add virtual hardware devices, said method comprising:

scanning, by a computer system, an external service directory having a plurality of virtual hardware devices, each virtual hardware device having a plurality of properties;

receiving, by the computer system, input selecting at least one new virtual hardware device and input selecting a specific set of properties from the plurality of properties, the specific set of properties defining operational characteristics of the virtual hardware device;

acquiring, by the computer system, said selected specific set of properties from the external service directory for the at least one new virtual hardware device;

storing, by the computer system, the specific set of properties for the virtual hardware device in the device listing;

presenting, by the computer system, said selected specific set of properties to a virtual machine operating in said virtual computing environment; and utilizing, by the computer system, said specific set of selected properties to instantiate a new virtual hardware device having the specific set of properties.

2. The method of claim 1 further comprising maintaining said device list in an emulation program.

3. The method of claim 1, further comprising:

executing, by the computer system, a virtual machine monitor, the virtual machine monitor having access to a first virtual machine device list, a second virtual machine device list, and the external device directory;

executing, by the computer system, the first virtual machine, the first virtual machine having virtual devices listed in the first virtual machine device list, the first virtual machine effectuating a first guest operating system; and executing, by the computer system, the second virtual machine, the second virtual machine having virtual devices listed in the second virtual machine device list, the second virtual machine effectuating a second guest operating system.

4. The method of claim 3, wherein scanning, by the computer system, the external service directory further comprises:

scanning, by the virtual machine monitor, the external service directory having a plurality of virtual hardware devices, each virtual hardware device having a plurality of properties.

5. The method of claim 3, wherein the first and second device lists are maintained by an emulation program.

6. The method of claim 1, wherein the new virtual hardware device includes a virtual hardware device based on a design for a physical hardware device.

7. A computer system configured to add a virtual hardware device to a virtual machine, the computer system comprising:

a processor;

a computer readable storage medium operatively coupled to the processor, the computer readable storage medium including encoded instructions that are executable by the processor, the computer readable storage medium comprising:

instructions for scanning an external service directory having a plurality of virtual hardware devices, each virtual hardware device having a plurality of properties;

instructions for receiving input selecting at least one new virtual hardware device and input selecting a specific set of properties from the plurality of properties, the specific set of properties defining operational characteristics of the virtual hardware device;

instructions for acquiring said selected specific set of properties from the external service directory for the at least one new virtual hardware device;

instructions for storing the specific set of properties for the virtual hardware device in the device listing;

instructions for presenting said selected specific set of properties to a virtual machine operating in said virtual computing environment; and instructions for utilizing said specific set of selected properties to instantiate a new virtual hardware device having the specific set of properties.

8. The computer system of claim 7, further comprising:

instructions for executing a virtual machine monitor, the virtual machine monitor having access to a first virtual machine device list, a second virtual machine device list, and the external device directory;

instructions for executing the first virtual machine, the first virtual machine having virtual devices listed in the first virtual machine device list, the first virtual machine effectuating a first guest operating system; and instructions for executing the second virtual machine, the second virtual machine having virtual devices listed in the second virtual machine device list, the second virtual machine effectuating a second guest operating system.

9. The computer system of claim 8, wherein scanning the external service directory further comprises:

instructions for scanning, by the virtual machine monitor, the external service directory having a plurality of virtual hardware devices, each virtual hardware device having a plurality of properties.

10. The computer system of claim 8, wherein the first and second device lists are maintained by an emulation program.

11. The computer system of claim 7, wherein the new virtual hardware device includes a virtual hardware device based on a design for a physical hardware device.

12. A computer readable storage medium encoded with computer executable instructions for adding a virtual hardware device to a virtual machine, the instructions that when executed, perform the following method:

scanning an external service directory having a plurality of virtual hardware devices, each virtual hardware device having a plurality of properties;

receiving input selecting at least one new virtual hardware device and input selecting a specific set of properties from the plurality of properties, the specific set of properties defining operational characteristics of the virtual hardware device;

acquiring said selected specific set of properties from the external service directory for the at least one new virtual hardware device;

storing the specific set of properties for the virtual hardware device in the device listing;

presenting said selected specific set of properties to a virtual machine operating in said virtual computing environment; and utilizing said specific set of selected properties to instantiate a new virtual hardware device having the specific set of properties.

13. The computer readable storage medium of claim 12, further comprising:

executing a virtual machine monitor, the virtual machine monitor having access to a first virtual machine device list, a second virtual machine device list, and the external device directory;

executing a first virtual machine, the first virtual machine having virtual devices listed in the first virtual machine device list, the first virtual machine effectuating a first guest operating system; and executing a second virtual machine, the second virtual machine having virtual devices listed in the second virtual machine device list, the second virtual machine effectuating a second guest operating system.

14. The computer readable storage medium of claim 13, wherein scanning the external service directory further comprises:

scanning, by the virtual machine monitor, the external service directory having a plurality of virtual hardware devices, each virtual hardware device having a plurality of properties.

15. The computer readable storage medium of claim 13, wherein the first and second device lists are maintained by an emulation program.

16. The computer readable storage medium of claim 12, wherein the new virtual hardware device includes a virtual hardware device based on a design for a physical hardware device.

17. A hardware control device for adding a virtual hardware device to a virtual machine, the hardware control device comprising:

processor means for scanning an external service directory having a plurality of virtual hardware devices, each virtual hardware device having a plurality of properties;

processor means for receiving input selecting at least one new virtual hardware device and input selecting a specific set of properties from the plurality of properties, the specific set of properties defining operational characteristics of the virtual hardware device;

processor means for acquiring said selected specific set of properties from the external service directory for the at least one new virtual hardware device;

processor means for storing the specific set of properties for the virtual hardware device in the device listing;

processor means for presenting said selected specific set of properties to a virtual machine operating in said virtual computing environment; and processor means for utilizing said specific set of selected properties to instantiate a new virtual hardware device having the specific set of properties.

18. The hardware control device of claim 17, further comprising:

processor means for executing a virtual machine monitor, the virtual machine monitor having access to a first virtual machine device list, a second virtual machine device list, and the external device directory;

processor means for executing the first virtual machine, the first virtual machine having virtual devices listed in the first virtual machine device list, the first virtual machine effectuating a first guest operating system; and processor means for executing the second virtual machine, the second virtual machine having virtual devices listed in the second virtual machine device list, the second virtual machine effectuating a second guest operating system.

19. The hardware control device of claim 17, wherein scanning the external service directory further comprises:

processor means for scanning, by the virtual machine monitor, the external service directory having a plurality of virtual hardware devices, each virtual hardware device having a plurality of properties.

20. The hardware control device of claim 19, wherein the first and second device lists are maintained by an emulation program.

21. The hardware control device of claim 17, wherein the new virtual hardware device includes a virtual hardware device based on a design for a physical hardware device.

* * * * *